United States Patent
Zhao et al.

(10) Patent No.: US 12,004,086 B2
(45) Date of Patent: Jun. 4, 2024

(54) CONTROL OF TERMINAL-REQUESTED POWER REDUCTION

(71) Applicant: SONY GROUP CORPORATION, Tokyo (JP)

(72) Inventors: Kun Zhao, Malmö (SE); Olof Zander, Södra Sandby (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 93 days.

(21) Appl. No.: 17/434,743

(22) PCT Filed: Mar. 18, 2020

(86) PCT No.: PCT/EP2020/057511
§ 371 (c)(1),
(2) Date: Aug. 28, 2021

(87) PCT Pub. No.: WO2020/221506
PCT Pub. Date: Nov. 5, 2020

(65) Prior Publication Data
US 2022/0132431 A1     Apr. 28, 2022

(30) Foreign Application Priority Data
Apr. 30, 2019 (SE) .................... 1950523-9

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC ............. H04W 52/146; H04W 52/367; H04W 52/386; H04W 52/34; H04B 7/0693; H04B 7/0691; H04B 7/0695
See application file for complete search history.

(56) References Cited

U.S. PATENT DOCUMENTS

| 2008/0153532 A1 | 6/2008 | Camp |
| 2012/0021707 A1 | 1/2012 | Forrester |

(Continued)

FOREIGN PATENT DOCUMENTS

| CN | 107509242 A | 12/2017 |
| CN | 107534486 A | 1/2018 |

(Continued)

OTHER PUBLICATIONS

Nokia et al: "On FR2 RF Exposure mitigation methods" 3GPP Draft; R1-1905229, Apr. 7, 2019, XP051700304 (Year: 2019).*

(Continued)

*Primary Examiner* — John J Lee
(74) *Attorney, Agent, or Firm* — Tucker Ellis LLP (57) ABSTRACT

Method, carried out in a radio terminal (130), for configuring uplink output power of radio transmission from the radio terminal, comprising determining (402) a demand power reduction (P-MPR1) based on a maximum power level associated with a first uplink duty cycle (UDC1); transmitting (403), to a radio network node (120), an indication (233) of the demand power reduction; receiving (404), from the network node, an indication (253) of a target power reduction (P-MPR2) associated with an actual uplink duty cycle (UDC2); and configuring (406) the output power based on the target power reduction.

26 Claims, 4 Drawing Sheets

(56) References Cited

U.S. PATENT DOCUMENTS

| | | | |
|---|---|---|---|
| 2012/0213172 A1* | 8/2012 | Kim | H04W 52/286 370/329 |
| 2014/0146680 A1* | 5/2014 | Wang | H04W 52/0206 370/236 |
| 2014/0187281 A1 | 7/2014 | Faraone | |
| 2015/0111608 A1 | 4/2015 | Kazmi | |
| 2018/0098292 A1 | 4/2018 | Gulati | |
| 2018/0167897 A1* | 6/2018 | Sampath | H04W 72/12 |
| 2018/0167916 A1 | 6/2018 | Zhang | |
| 2018/0323947 A1 | 11/2018 | Brunel | |

FOREIGN PATENT DOCUMENTS

| | | |
|---|---|---|
| CN | 109155976 A | 1/2019 |
| CN | 109314936 A | 2/2019 |
| WO | WO-2018141457 A1 | 8/2018 |
| WO | 2019218112 A1 | 11/2019 |

OTHER PUBLICATIONS

"Enhancements on Multi-beam Operation", Nokia, Nokia Shanghai Bell, 3GPP TSG RAN WGI #96b RI-1905065, Internet<URL:https://www.3gpp.org/ftp/tsg_ran/WG1_RL1/TSGR1_96b/Docs/RI-1905065.zip>, Mar. 29, 2019.

"Discussion on UE RF exposure compliance in FR2", OPPO, 3GPP TSG RAN WG4 #89 R4-1814957, Internet<URL:https://www.3gpp.org/ftp/tsg_ran/WG4_Radio/TSGR4_89/Docs/R4-1814957.zip>, Nov. 2, 2018.

International Search Report and Written Opinion from corresponding International Application No. PCT/EP2020/057511, dated Jun. 24, 2020, 11 pages.

Nokia et al., "On FR2 RF Exposure mitigation methods," 3GPP TSG RAN WG1 Meeting #96bis, R1-1905229, Apr. 8-12, 2019, 3 pages.

Intel Corp., "RFE compliance in FR2—ad hoc minutes," 3GPP TSG=RAN WG4 Meeting #89, R4-1816637, Nov. 12-16, 2018, 5 pages.

Nokia et al., "Maximum uplink duty cycle for FR2 and FR2 performance implications," 3GPP TSG RAN Meeting #83, RP-190483, Mar. 18-21, 2019, 2 pages.

Swedish Office Action and Search Report from corresponding Swedish Application No. 1950523-9, dated Dec. 13, 2019, 8 pages.

Qualcomm et al., "Way Forward on mmW power class"; 3GPP TSG-RAN WG4#83; R4-170xxxx; dated May 15-19, 2017, 6 pages.

Ericsson et al., "Definition of UE power class," TSG-RAN Working Group 4 (Radio) meeting #83; R4-1705106, May 15-19, 2017, 7 pages.

Ericsson et al., "Metrics for power reduction, minimum output power and configured output power for mmW bands," TSG-RAN Working Group 4 (Radio) meeting #83; R4-1705108; May 15-19, 2017, 3 pages.

Ericsson, Sony, "P-MPR reporting for MPE enhancement", 3GPP TSG RAN WG4 #94-e R4-2001324, Feb. 24-Mar. 6, 2020.

Ericsson, Sony, "Views on MPE", 3GPP TSG RAN WG4 Meeting #92Bis R4-1912319, Chongqing, CN, Oct. 14-18, 2019.

Sony, "Considerations on the enhancement of multi-beam operation", 3GPP TSG RAN WGI #102-e R1-2005560, Aug. 17-18, 2020.

Apple, "Considerations on multi-panel and MPE in FR2", 3GPP TSG RAN WG1 #96Bis R1-1904983, Apr. 8-12, 2019, Xi-an, China.

Nokia, Nokia Shanghai Bell, "FR2 UE RF exposure compliance and new UE P-MPR information to network", 3GPP TSG-RAN WG#4 Meeting #88bis R4-1813169, , Oct. 8-12, 2018, Chengdu, China.

Intel Corporation, "Uplink duty cycle control as link failure mitigation technique in FR2", 3GPP TSG-RAN WG4 Meeting#89 R4-1815787, Nov. 8-12, 2018, Spokane, USA.

Nokia, Nokia Shanghai Bell, "Maximum uplink duty cycle for FR2 UE and its implications", 3GPP TSG-RAN WG4 Meeting #90bis R4-1903083, Apr. 8-12, 2019, Xian, China.

Qualcomm Incorporated, "Interpretation of maxUL duty cycle with lower powers and P-bit usage in PHR", 3GPP TSG-RAN WG4 Meeting #90bis R4-1903127, Apr. 8-12, 2019.

* cited by examiner

CONTROL OF TERMINAL-REQUESTED POWER REDUCTION

TECHNICAL FILED

Solutions provided herein are associated with configuration and management of output transmission power in a terminal operating in a radio communication network. Specifically, solutions are provided for allowing control, such as modification or moderation, of terminal-requested power management, by taking both power reduction and uplink duty cycle into consideration.

BACKGROUND

Radio communication systems operating under various iterations of the $3^{rd}$ Generation Partnership Project (3GPP) offer high peak data rates, low latency, improved system capacity, and low operating cost resulting from simple network architecture. These include inter alia Long-Term Evolution (LTE) system and more recently so called 5G networks and New Radio (NR). Orthogonal frequency division multiplexing (OFDM) radio technology has been incorporated to enable high data bandwidth to be transmitted efficiently while still providing a high degree of resilience to reflections and interference. In such radio communication systems, the transmit power of each mobile terminal, also referred to as User Equipment (UE), needs to be maintained at a certain level and regulated by the network. The maximum transmit power capacity of each UE, however, is different depending on UE capability and situation. Power headroom report (PHR) is a mechanism to configure the UE to provide its power capacity and usage to the network. A UE uses PHR mechanism to periodically provide its serving base station with its power headroom (PH), which is defined as a power offset between a UE-configured maximum transmit power and a UE-calculated current UE transmit power. Based on the received PH information, the eNB can regulate the UE transmit power with proper resource allocation.

When operating a UE in the mm Wave frequencies the functionality of beamforming is essential, since it—contrary to an omnidirectional transmission—allows transmissions to be directed so that the signal to noise ratio is improved. However, there are restrictions to handle maximum exposure of signal energy to a user utilizing the UE. Hence, it has been concluded in 3GPP that the UE in FR2 (Frequency Range 2—spectrum within the mm wave range) will likely face critical restriction on the Maximum Permitted Exposure (MPE) due to the governments and regulators' limitations. Two methods have therefore been introduced during Rel-15 in the specifications to enable the UE to comply with regulatory exposure limits. One is Power Management Maximum Power Reduction (P-MPR), and the other is maxUplinkDutyCycle capability.

With P-MPR the 3GPP standard allows the UE to reduce its output power to meet the requirements. However, this has the drawback that the UE must take the worst case transmission duty cycle into account since the UE will not be aware of the network scheduling intentions. Hence, the P-MPR method will be a coarse method.

Upon registration to the network, the UE reports its maximum uplink duty cycle capability, indicating the max duty cycle the UE should be scheduled. However, since this indication is a capability and not a dynamic signaling this is an even more coarse method.

There consequently exists a need for a more flexible solution for configuring transmit power of a UE in a radio communication network.

SUMMARY

Solutions are provided herein which target the identified need. These solutions are provided in the independent claims, and various embodiments are set out in the dependent claims.

These proposed solutions are inter alia related to a method carried out in a radio terminal adapted to configure uplink output power of radio transmission. The method comprises
  determining a demand power reduction based on a maximum power level associated with a first uplink duty cycle;
  transmitting, to a radio network node, an indication of the demand power reduction;
  receiving, from the network node, an indication of a target power reduction associated with an actual uplink duty cycle; and
  configuring the output power based on the target power reduction.

The proposed solutions further relate to a method carried out in a radio network node for configuring uplink output power of radio transmission from a radio terminal, comprising
  receiving, from the radio terminal, an indication of a demand power reduction based on a maximum power level, associated with uplink transmission with a first uplink duty cycle;
  determining a target power reduction for the radio terminal;
  transmitting, to the radio terminal, an indication of the determined target power reduction to apply by the radio terminal for configuring the output power.

This method may further include scheduling uplink transmission from the terminal in accordance with an actual uplink duty cycle associated with the determined target power reduction.

Solutions also include a terminal and a radio network node, configured to operate these embodiments.

By means of the proposed solutions, the terminal may be configured to lower its output power, while at the same time have the demanded power reduction moderated by the network. Moreover, the moderation of the power reduction may be associated with a change applied in terms of uplink duty cycle, so as to meet an exposure limit or regulation.

DETAILED DESCRIPTION

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various propositions exist on how to manage moderation of terminal output power, e.g. for transmission in FR2, having a Frequency Range Designation of 24250-52600 MHz. This has included defining the maximum uplink duty cycle under peak beam facing human body condition, as the UE capability maxUplinkDutyCycle capability. There are many drawbacks to be considered, though, in the general concept of P-MPR and maxUplinkDutyCycle. As the uplink beam will change from time to time in real life, the solution for mitigating the MPE must be carried out in a dynamic manner. Existing solutions for mitigating the MPE issue includes the dynamically reporting the maximum uplink duty cycle restriction, as well as the PHR (Power Headroom Report). However, there are several issues with dynamically reporting PHR with maximum uplink duty cycle restriction:

1. The PHR for FR 2 is unclear, since the transmitted power is not only limited by the Total Radiated Power (TRP), e.g. 23 dBm for Power Class (PC) 3 but also the Effective Isotropic Radiated Power (EIRP), which is 43 dBm for PC 3. A maximum power level Pmax allowed to meet MPE restrictions and regulations may thus be determined based on a number of parameters. It may therefore not be easy to compromise the power level with two different values since they will vary from UE to UE, or even beam to beam within a UE.

2. As the PHR indicates how much power extra the UE can transmit, the base station, e.g. a gNB, cannot know explicitly how much power the UE needs to back off to meet the MPE requirement.

3. PHR reporting is MAC-CE based (Media Access Control—Control Element) and not very frequent, it may not be flexible enough for backing off the power or even selecting other beams in a real network.

4. To configure the P-MPR and uplink duty cycle only from the UE side is not optimal for the overall performance of the cell. Too low transmitted power or too limited uplink duty cycle of the UE may lead a poor coverage and a low efficient network.

5. Spatial relation optimization has not been defined rather than a rough description of bad beam avoidance.

Various embodiments will now be described with reference to the drawings, representing solutions arranged to overcome at least some of the state of the art deficiencies.

Figure 1:
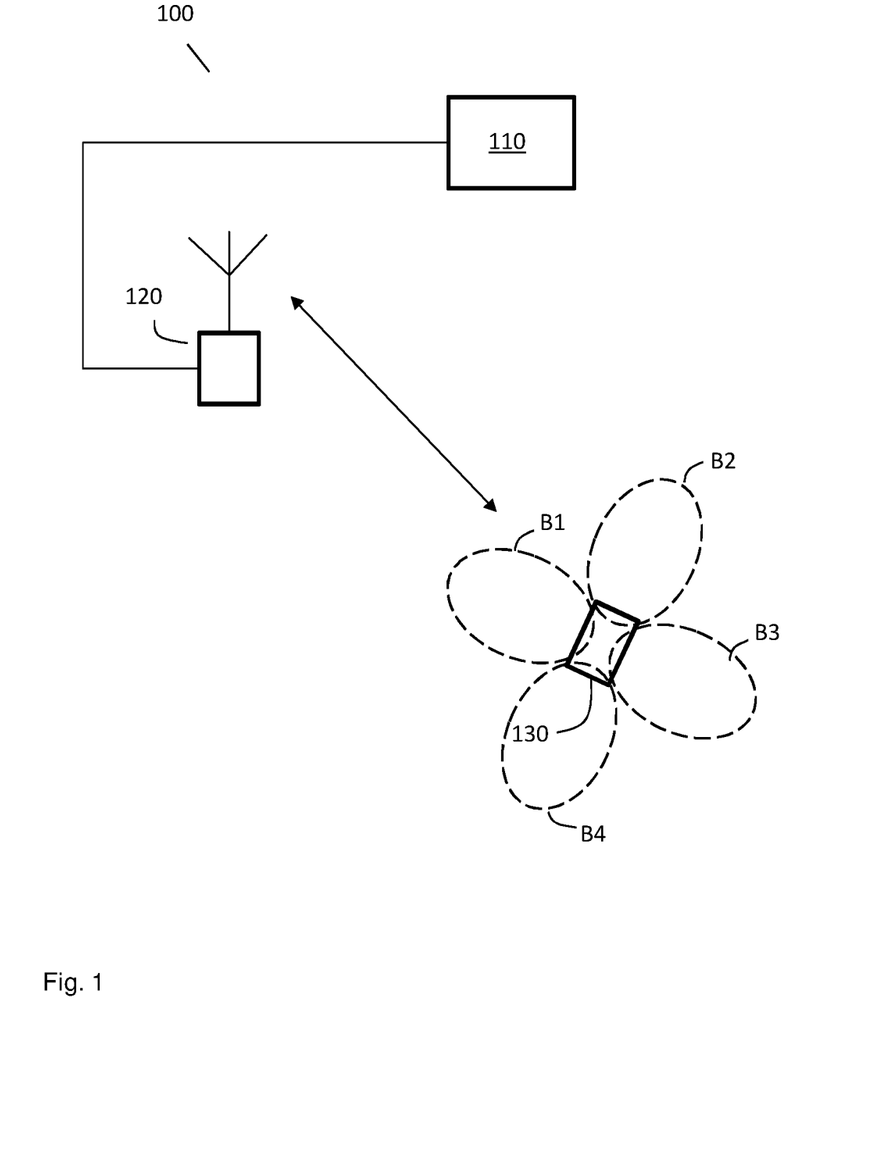
FIG. 1 schematically illustrates a radio communication network and communication between a radio network node and a radio terminal according to various embodiments.

FIG. 1 schematically illustrates a wireless communication system including a wireless communication network 100, and a terminal (or UE) 130 configured to wirelessly communicate with the network 100. The network may be a radio communication network operating under general and specific regulations and limits published by the 3GPP, such as a New Radio (NR) network which may operate under FR 2. The network 100 may include a core network 110 and one or more radio network nodes 120, of which one is illustrated in FIG. 1. The radio network node 120 may be a gBN and be configured for beamforming as introduced for 5G. The radio network node 120 may also be referred to as an access node or base station.

The radio terminal 130 may be any device operable to wirelessly communicate with the network 100 through the radio access node 120, such as a mobile telephone, computer, tablet, a M2M device or other. In various embodiments, the terminal 130 may be configured to communicate in more than one beam B1-B4, which are schematically illustrated in FIG. 1. The beams B1-B4 are preferably orthogonal in terms of coding and/or frequency division and/or time division. Configuration of beams in the terminal 130 may be realized by using an antenna array configured to provide an anisotropic sensitivity profile to transmit radio signals in a particular transmit direction.

Figure 2:
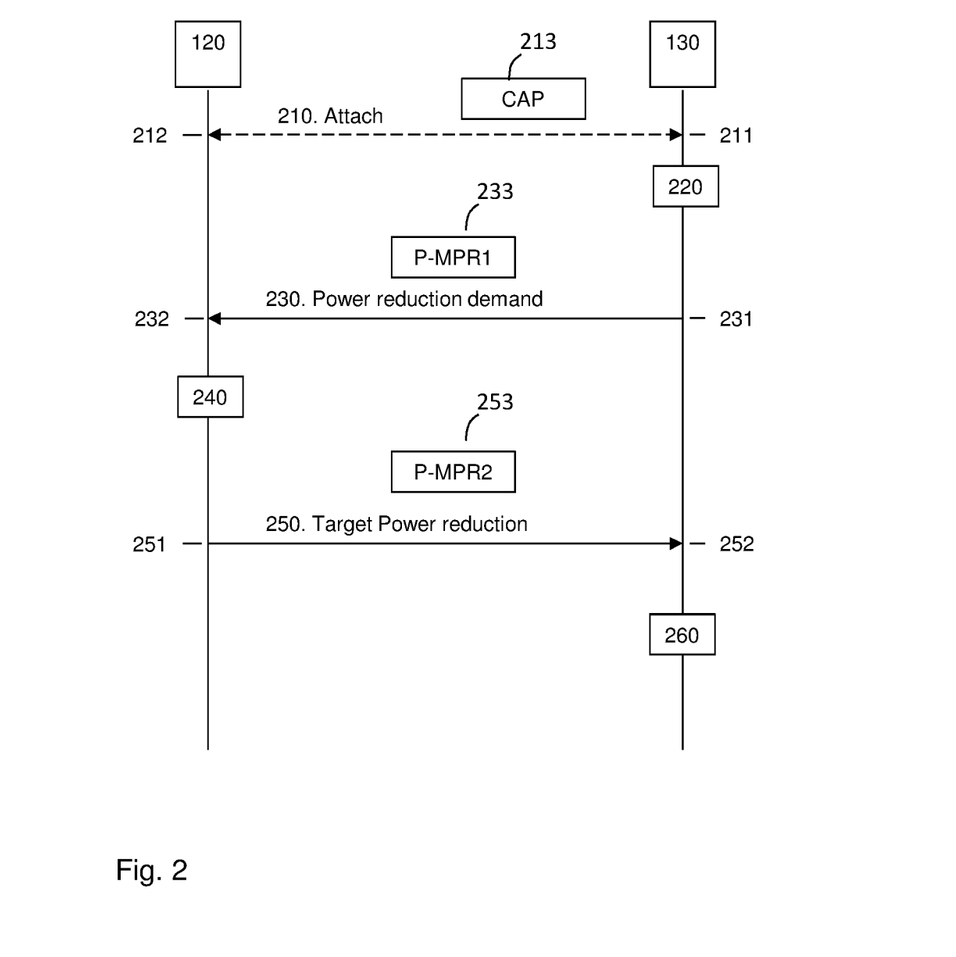
FIG. 2 schematically illustrates a signaling diagram between different entities of a system according to various embodiments, including those of FIG. 1.

FIG. 2 schematically illustrates a signaling diagram arranged according to various embodiments, seeking to mitigate or resolve the above issues. The drawing illustrates signaling between the terminal 130 and the radio network node 120, which may correlate to FIG. 1.

The terminal 130 may analyze and process 220 information associated with transmission of data, to determine that a certain power reduction may be appropriate in the uplink, i.e. from the terminal 130 to the radio network node 120. A reason for wanting to transmit at a lower output power may be that transmission is allocated to a tight frequency resource that risks contamination outside the intended frequency range. Another reason may be that uplink transmission is intended in a beam B1 that is associated with a direction that may require a lower output power. The terminal 130 may thus determine a demand power reduction P-MPR1 based on a maximum power level, associated with a first uplink duty cycle UDC1.

The uplink duty cycle will be determined and controlled by the radio network node when scheduling resources for uplink communication. The terminal 130 is associated with a maximum uplink duty cycle MUDC, a certain maximum value, e.g. a percentage, that may be a predetermined UE capability for uplink transmission. In various embodiments, the maximum uplink duty cycle MUDC may thus be a predetermined value associated with the terminal 130, either as a specific device or as a type of device, i.e. brand, model etc.

The first uplink duty cycle UDC1, i.e. the uplink duty cycle on which the demand power reduction P-MPR1 is based, may in some embodiments be the maximum uplink duty cycle MUDC. The maximum uplink duty cycle MUDC may be previously shared by the terminal 130 upon registering to the network 100 as a UE capability CAP provided by data transmission 213 in an attach procedure 210.

In other embodiments, the first uplink duty cycle UDC1 may be another fixed predetermined value, e.g. determined by specification, and may be generic rather than associated with UE capability for the terminal 130 in question.

In other alternative embodiments, the first uplink duty cycle UDC1 may have been a previously assigned or configured by the network 100 after registering and may thus be different from the maximum uplink duty cycle MUDC. In such embodiments, the first uplink duty cycle UDC1 may be signaled from the radio network node 120 to the terminal 130.

In yet another embodiment, the first uplink duty cycle may be assessed by the terminal 130, e.g. based on uplink transmission during a certain time window, e.g. a preceding window of 1 s. In such an embodiment, the first uplink duty cycle UDC1 represents a current uplink duty cycle, configured by the radio network node 120 and obtained by the terminal 130, either by receiving an indication of the uplink duty cycle UDC1 or by assessment of the employed uplink duty cycle within a certain time period.

The first uplink duty cycle UDC1 may in various embodiments thus be the maximum uplink duty cycle MUDC associated with the terminal 130, or a network-configured different uplink duty cycle.

The terminal 130 may transmit 231 a power reduction demand message 230 to the radio network node 120, comprising an indication 233 of the demand power reduction P-MPR1. The power reduction demand message 230 may e.g. be conveyed as Uplink Control Information UCI. Some plausible alternatives may include transmission as a physical layer uplink message, as a part of RRC signaling, or a piggy back message in HARQ signaling. The indication 233 of the demand power reduction P-MPR1 may include data identifying the demand power reduction P-MPR1, which may be a specific power value indication, or e.g. a delta value of desired power reduction, or a percentage value. In some embodiments, the data indicating the demand power reduction P-MPR1 may be an indicator which may be assessed by the receiving radio network node 120 to correlate to a certain level of desired power reduction or power level, e.g. based on a lookup table.

In some embodiments, the power reduction demand may comprise an indication of the associated first uplink duty cycle UDC1, based on which the demand power reduction P-MPR1 has been determined.

Upon receiving 232 the indication 233 of the demand power reduction P-MPR1, the radio network node 120 may analyze and process 240 any received data. This may include analyzing the expected quality or signal strength obtained if the demand power reduction P-MPR1 is employed. In various embodiments, the processing 240 may indicate that employing the demand power reduction P-MPR1 will have negative effects in terms of communication reliability or quality. The processing 240 may thus include determining a target power reduction P-MPR2 for the radio terminal, associated with an actual uplink duty cycle UDC2. Specifically, the target power reduction P-MPR2 may be different from, i.e. higher or lower than, the demand power reduction P-MPR1. In such an embodiment, the actual uplink duty cycle UDC2 may further be different from the first uplink duty cycle UDC1. In some embodiments, the power reduction P-MPR and the uplink duty cycle UDC are controlled, by the radio network node 120, in dependence of each other, such that the total power or exposure remains the same or remains below a threshold value associated with total transmit power.

The radio network node may be configured to respond to the power reduction demand message 230 by a target power reduction message 250, by transmitting 251 an indication of the target power reduction P-MPR2. This indication may include data 253 identifying the target power reduction P-MPR2, which may be a specific power value indication, or e.g. a delta value of desired power reduction, or a percentage value. In some embodiments, the data indicating the target power reduction P-MPR2 may be an indicator which may be assessed by the terminal 130 to correlate to a certain level of desired power reduction or power level, e.g. based on a lookup table. In some embodiments, the target power reduction message 250 may include an indication of the actual uplink duty cycle UDC2.

In other embodiments, wherein the processing 240 indicates that the demand power reduction P-MPR1 is acceptable, the radio network node may be configured to acknowledge 251 the power reduction demand message 230 to the terminal 130, or not respond at all.

The terminal 130 may receive 252 data associated with the target power reduction P-MPR2, such as the data 253 indicating the target power reduction P-MPR2. Further processing 260 may be carried out in the terminal 130 to assess the target power level to employ. The terminal 130 will then configure 260 the output power based on the target power reduction, in the resources allocated to it by the radio network node 120 for uplink transmission. The radio network node 120 will further schedule such resources in accordance with the actual uplink duty cycle UDC2.

These embodiments thus outline a method in which a terminal 130 may include information of a demand P-MPR1 associated with a specified uplink duty cycle. Hence, the terminal 130 will indicate that for a given uplink duty cycle and a current beam B1 usage, the terminal 130 would need or desire a specific P-MPR1. The network 100 can then take this into account, and signal to the terminal 130 which P-MPR to use. Specifically, in case the terminal 130 would signal a lower P-MPR1 the network should assign a lower duty cycle than the first uplink duty cycle UDC1, based on which the terminal 130 has calculated the demand power reduction P-MPR1.

The maximum uplink duty cycle MUDC may as one example be specified in 3GPP specifications, e.g. 100%. In other examples, the network 100 may indicate the uplink duty cycle UDC to use, e.g. in broadcast or RRC signaling. In a further example, the terminal 130 may decide upon an uplink duty cycle UDC to use, e.g. the MUDC, based on e.g. UE capability and signal that selected value, e.g. as part of a UE capability signaling or as part of the power reduction demand 230.

In various embodiments, the signaling should be dynamically updated in order to adapt to changes in the terminal 130 orientation and relative position between the radio network node 120 and the terminal 130. Dependent on detection of relevant change or orientation or relative position of the terminal 130, the processing 220 and subsequent transmission 231 of a power reduction demand may be triggered. Alternatively, the processing 220 is carried out on a periodical scheme, whereas the transmission 231 of the power reduction demand 230 is carried out when called for as an outcome of the processing 220. The processing 220 and/or the transmission 231 of the power reduction demand may be triggered by one or more of the mentioned sensors in the terminal 130.

For this embodiment as well as the further alternative embodiments below, the network will take the signaled information from the terminal 130 into account and configure a combination of the P-MPR and uplink duty cycle based on the terminal 130 scenario and network situation (e.g. how far the terminal 130 is to the radio network node 120 and how busy the network is in terms of uplink). The network will then as part of the control information sent in the downlink, e.g. as part of the uplink resource allocations (uplink scheduling) inform the terminal 130 of which P-MPR to use.

By means of the described embodiments, a situation where a terminal 130 desires a certain demand power reduction P-MPR1, based on a first uplink duty cycle UDC1, the network 100, through its radio network node 120, may configure the terminal 130 to apply a target power reduction P-MPR2 which is different from what was demanded, while at the same time apply scheduling of resources for uplink transmission using a different, actual, uplink duty cycle. Specifically, the actual uplink duty cycle UDC2 and the target power reduction P-MPR2 are determined such that a level for maximum exposure is not exceeded. As an example, the terminal 130 may require or demand 6 dB back off as P-MPR1 when it operates with 100% uplink duty cycle. In order to maintain a stable uplink, determined by analysis and processing 240, the radio network node 120 may configure the terminal 130 with a reduced 3 dB P-MPR2, but scheduled at only a 50% uplink duty cycle.

Figure 3:
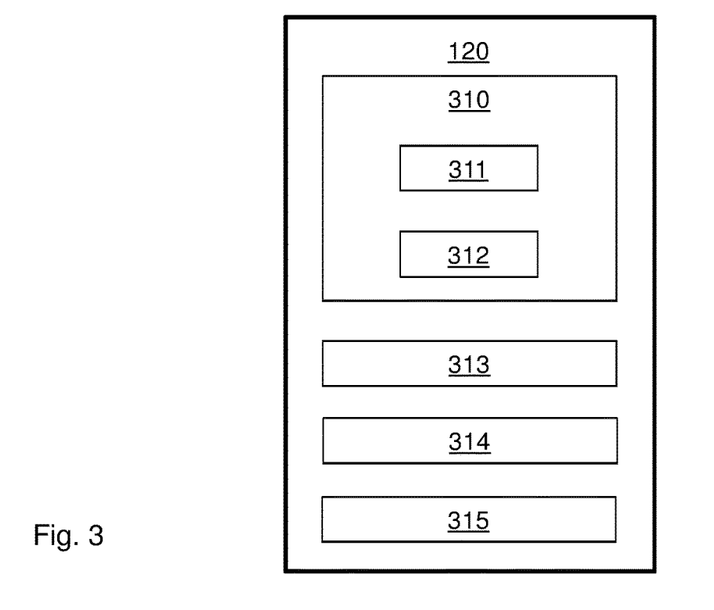
FIG. 3 schematically illustrates a radio communication terminal configured to operate according to various embodiments.

FIG. 3 schematically illustrates an embodiment of the radio communication terminal 130 for use in a radio communication network 100 as presented herein, and for carrying out the method steps as outlined. This embodiment is consistent with the scenario of FIG. 1 and the signaling diagram of FIG. 2.

The terminal 130 may comprise a radio transceiver 313 for communicating with other entities of the radio communication network 100, such as the radio network node 120. The transceiver 313 may thus include a radio receiver and transmitter for communicating through at least an air interface.

The terminal 130 further comprises logic 310 configured to communicate data, via the radio transceiver, on a radio channel, to the wireless communication network 100 and/or directly with another terminal, by Device-to Device (D2D) communication.

The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the terminal 130 to carry out any of the method steps as provided herein. Software defined by said computer program code may include an application or a program that provides a function and/or a process. The software may include device firmware, an operating system (OS), or a variety of applications that may execute in the logic 310.

The terminal 130 may further comprise an array 314, which may include an antenna array. The logic 310 may further be configured to control the radio transceiver to employ an anisotropic sensitivity profile of the antenna array to transmit radio signals in a particular transmit direction.

The terminal 130 may further comprise one or more sensors 315, such as a proximity sensor, accelerometer, magnetometer, etc., configured to sense and detect orientation or proximity to another object, such as a user of the terminal 130.

Obviously, the terminal may include other features and elements than those shown in the drawing or described herein, such as a power supply, a casing, a user interface etc.

Figure 4:
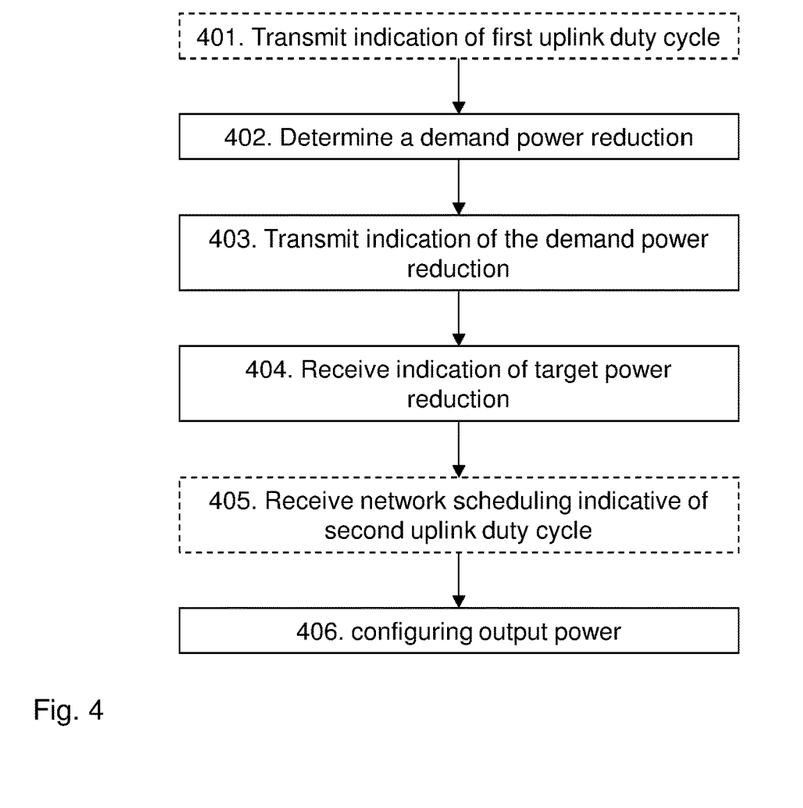
FIG. 4 schematically illustrates method steps carried out by a terminal according to various embodiments.

FIG. 4 schematically illustrates method steps which the terminal 130 may be configured to carry out. In one embodiment, the radio communication terminal 130 may be adapted for configuring uplink output power of radio transmission from the radio terminal and comprise the radio transceiver 323 and the logic 320, wherein the logic is configured to communicate data, via the radio transceiver. The logic may further be configured to determine 402 a demand power reduction P-MPR1 based on a maximum power level, associated with a first uplink duty cycle UDC1;

transmit 403, to a radio network node 120, an indication 233 of the demand power reduction;

receive 404, from the network node, an indication 253 of a target power reduction P-MPR2 associated with an actual uplink duty cycle UDC2; and configure 406 the output power based on the target power reduction.

This way, the terminal 130 may be configured to lower its output power, while at the same time have the demanded power reduction moderated by the network. Moreover, the moderation of the power reduction may be associated with a change applied in terms of uplink duty cycle, so as to meet an exposure limit or regulation.

In some embodiments, the target power reduction P-MPR2 is different from the demand power reduction P-MPR1, such as smaller or larger than the demand power reduction P-MPR1.

The logic may be configured to transmit 401,403, to the network node 120, an indication 213, 233 of the first uplink duty cycle UDC1. The first uplink duty cycle may e.g. be a maximum uplink duty cycle MUDC, provided in UE capability CAP. The first uplink duty cycle UDC1 may alternatively be a calculated value based on preceding uplink transmission.

The logic may in various embodiments be configured to receive 405, from the network node, network scheduling indicative 253 of the actual uplink duty cycle UDC2, which the network node 120 has decided to apply for the target power reduction P-MPR2.

In some embodiments, the actual uplink duty cycle is different from the first uplink duty cycle.

In some embodiments, the actual uplink duty cycle has a lower value than the first uplink duty cycle.

In some embodiments, the actual uplink duty cycle has a higher value than the first uplink duty cycle.

The logic may in various embodiments be configured to transmit 231 spatial relation information for an uplink beam associated with said target power reduction.

In some embodiments, the logic may be configured to determine the demand power reduction for each one of a plurality of uplink beams B1-B4, wherein said indication of the demand power reduction indicates a power value for each of said plurality of uplink beams. Signaling of the demand power reduction P-MPR1 can thus be carried out for multiple beams of the terminal 130, in order to assist the radio network node 120 in selecting an optimized beam pair for the communication. Therefore, the signaling of the power reduction demand message 230 may include both the P-MPR1 as well as spatial relation information. In various embodiments, the spatial information may include one or more of a beam ID, a reference signal, a pair of SRS, and SSB/CSI-RS information. As noted, the power reduction demand message 230 may optionally include, or be associated with an additional message including, the assumed duty cycle UDC1. As described above, reporting of the assumed duty cycle UDC1 is optional since the terminal 130 can be required to report the P-MPR with a reference uplink duty cycle UDC1, e.g. the MUDC or 100% as a default value, for all the beams it uses for monitoring the PDCCH. The power reduction demand message 230 may in various embodiments be transmitted through PUCCH or PUSCH, e.g. with up to 4 beams.

The logic may be configured to report one demand P-MPR value for each beam B1-B4. Alternatively, the logic may be configured to report a demand power reduction P-MPR1 for one beam B1, e.g. a currently used beam, whereas the corresponding demand power reduction of other candidate beams B2-B4 can be reported as a delta value to the reference beam. The indication of the demand power reduction P-MPR1 may thus indicate a beam-specific value for a reference beam B1 and a relative value, associated with the beam-specific value, for another beam B2 among said plurality of uplink beams.

Figure 5:
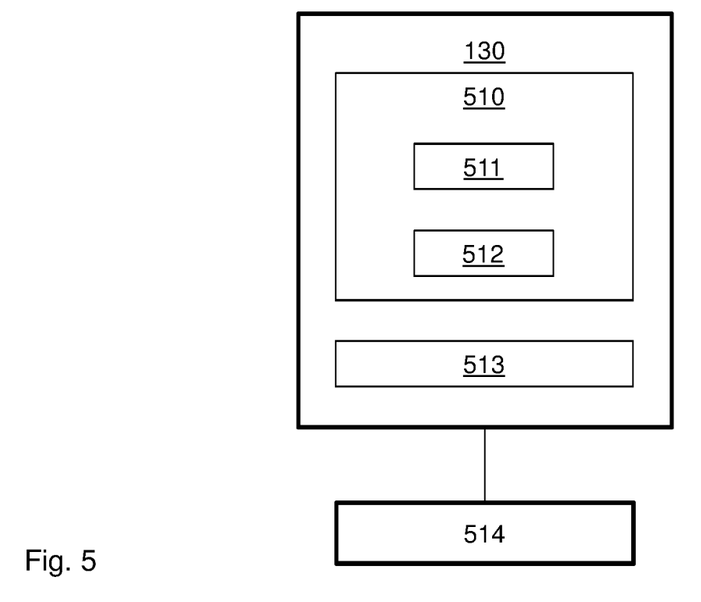
FIG. 5 schematically illustrates a radio network node configured to operate according to various embodiments.

FIG. 5 schematically illustrates a radio network node 120 for use in a radio communication network 100 as presented herein, and for carrying out the method steps as outlined for controlling one or more terminals 130. This embodiment is consistent with the scenario of FIG. 1 and the signaling diagram of FIG. 2. The radio network node 120 includes a base station of a radio communication network 100, such as a gNB. The radio network node 120 may comprise a radio transceiver 513 for communicating with other entities of the radio communication network 100, such as the terminal 130.

The transceiver 513 may thus include a radio receiver and transmitter for communicating through at least an air interface.

The base station 120 further comprises logic 510 configured to communicate data, via the radio transceiver, on a radio channel, with terminal 130. The logic 510 may include a processing device 511, including one or multiple processors, microprocessors, data processors, co-processors, and/or some other type of component that interprets and/or executes instructions and/or data. Processing device 511 may be implemented as hardware (e.g., a microprocessor, etc.) or a combination of hardware and software (e.g., a system-on-chip (SoC), an application-specific integrated circuit (ASIC), etc.). The processing device 511 may be configured to perform one or multiple operations based on an operating system and/or various applications or programs.

The logic 510 may further include memory storage 512, which may include one or multiple memories and/or one or multiple other types of storage mediums. For example, memory storage 512 may include a random access memory (RAM), a dynamic random access memory (DRAM), a cache, a read only memory (ROM), a programmable read only memory (PROM), flash memory, and/or some other type of memory. Memory storage 512 may include a hard disk (e.g., a magnetic disk, an optical disk, a magneto-optic disk, a solid state disk, etc.).

The memory storage 512 is configured for holding computer program code, which may be executed by the processing device 511, wherein the logic 510 is configured to control the radio device 120 to carry out any of the method steps as provided herein. Software defined by said computer program code may include an application or a program that provides a function and/or a process. The software may include device firmware, an operating system (OS), or a variety of applications that may execute in the logic 510.

The radio network node 120 may further comprise an antenna 514 connected to the radio transceiver 513, which antenna may include an antenna array. The logic 510 may further be configured to control the radio transceiver to employ an anisotropic sensitivity profile of the antenna array to transmit and/or receive radio signals in a particular transmit direction.

Figure 6:
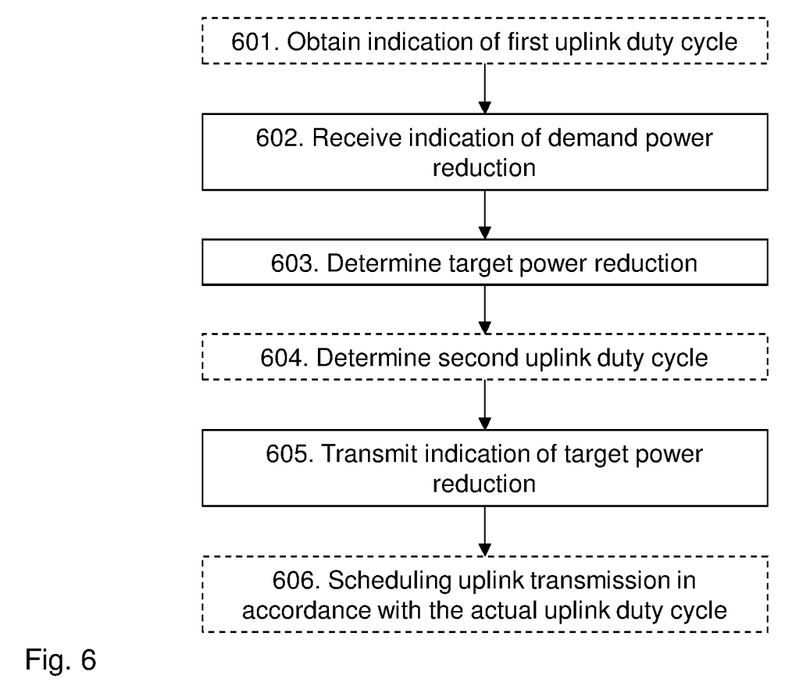
FIG. 6 schematically illustrates method steps carried out by a radio network node according to various embodiments.

In various embodiment, the radio network node 120 is configured to
- receive 602, from the radio terminal 130, an indication 233 of a demand power reduction P-MPR1 which is based on a maximum power level, associated with uplink transmission with a first uplink duty cycle UDC1;
- determine 603 a target power reduction P-MPR2 for the radio terminal; and
- transmit 605, to the radio terminal, an indication 253 of the target power reduction to apply by the radio terminal for configuring the output power.

This way, the terminal 130 may be configured to control a terminal desirous to lower its output power, while at the same time moderating the demanded power reduction. Moreover, the moderation of the power reduction may be associated with a change applied in terms of uplink duty cycle, so as to meet an exposure limit or regulation.

In some embodiments, the target power reduction P-MPR2 is different from the demand power reduction, such as smaller or larger than the demand power reduction P-MPR1.

In some embodiments, the logic 510 is configured to
determine 604 an actual uplink duty cycle UDC2 associated with the target power reduction; and
schedule uplink transmission from the terminal in accordance with the actual uplink duty cycle.

In various embodiments, the actual uplink duty cycle is different from the first uplink duty cycle.

Specifically, in some embodiments wherein the target power reduction P-MPR2 is smaller than the demand power reduction P-MPR1, the actual uplink duty cycle UDC2 has a lower value than the first uplink duty cycle UDC1.

Correspondingly, in some embodiments wherein the target power reduction P-MPR2 is larger than the demand power reduction P-MPR1, the actual uplink duty cycle UDC2 has a higher value than the first uplink duty cycle UDC1.

In some embodiments, the logic may be configured to receive 232 spatial relation information for an uplink beam associated with said demand power reduction. In such an embodiment, said indication of the demand power reduction may indicate a power value for each of a plurality of uplink beams. The indication of the demand power reduction may indicate a beam-specific value for a reference beam B1 and a relative value, associated with the beam-specific value, for another beam B2 among said plurality of uplink beams. Alternatively, the indication of a target power reduction may indicate a power value for each of said plurality of uplink beams.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

The invention claimed is:

1. A method, carried out in a radio network node, for configuring uplink output power of radio transmission from a radio terminal, said method comprising:
   determining a demand power reduction based on a maximum power level associated with a first uplink duty cycle;
   transmitting, to a radio network node, an indication of the demand power reduction; and
   receiving, from the network node, an indication of an actual uplink duty cycle and of a target power reduction associated with the actual uplink duty cycle;
   wherein the receiving comprises receiving, from the network node, network scheduling for an uplink transmission of the radio terminal in accordance with the actual uplink duty cycle; and
   configuring the output power based on the target power reduction.

2. The method of claim 1, wherein the target power reduction is different from the demand power reduction.

3. The method of claim 1, wherein the target power reduction is smaller than the demand power reduction.

4. The method of claim 3, wherein the actual uplink duty cycle has a lower value than the first uplink duty cycle.

5. The method of claim 1, wherein the target power reduction is larger than the demand power reduction.

6. The method of claim 5, wherein the actual uplink duty cycle is different from the first uplink duty cycle.

7. The method of claim 5, wherein the actual uplink duty cycle has a higher value than the first uplink duty cycle.

8. The method of claim 1, comprising
   transmitting, to the network node, an indication of the first uplink duty cycle.

9. The method of claim 1, comprising
   transmitting spatial relation information for an uplink beam associated with said target power reduction.

10. The method of claim 1, wherein determining a demand power reduction is carried out for each one of a plurality of uplink beams, wherein said indication of the demand power reduction indicates a power value for each of said plurality of uplink beams.

11. The method of claim 10, wherein the indication of a target power reduction indicates power value for each of said plurality of uplink beams.

12. The method of claim 10, wherein said indication of the demand power reduction indicates a beam-specific value for a reference beam and a relative value, associated with the beam-specific value, for another beam among said plurality of uplink beams.

13. A method, carried out in a radio network node, for configuring uplink output power of radio transmission from a radio terminal, comprising
   receiving, from the radio terminal, an indication of a demand power reduction based on a maximum power level, associated with uplink transmission with a first uplink duty cycle;
   determining a target power reduction for the radio terminal;
   determining an actual uplink duty cycle associated with the target power reduction associated with the target power reduction;
   transmitting, to the radio terminal, an indication of the determined target power reduction to apply by the radio terminal for configuring the output power; and
   wherein the transmitting comprises scheduling uplink transmission from the terminal in accordance with the actual uplink duty cycle.

14. The method of claim 13, wherein the target power reduction is different from the demand power reduction.

15. The method of claim 13, wherein the target power reduction is smaller than the demand power reduction.

16. The method of claim 13, wherein the target power reduction is larger than the demand power reduction.

17. The method of claim 13, wherein
   the target power reduction is smaller than the demand power reduction; and
   the actual uplink duty cycle has a lower value than the first uplink duty cycle.

18. The method of claim 13, wherein the target power reduction is larger than the demand power reduction; and
   the actual uplink duty cycle has a higher value than the first uplink duty cycle.

19. The method of claim 13, comprising
   receiving spatial relation information for an uplink beam associated with said demand power reduction.

20. The method of claim 19, wherein the indication of a target power reduction indicates at least one uplink beam for the terminal to use.

21. The method of claim 13, wherein said indication of the demand power reduction indicates a power value for each of a plurality of uplink beams.

22. The method of claim 21, wherein said indication of the demand power reduction indicates a beam-specific value for a reference beam and a relative value, associated with the beam-specific value, for another beam among said plurality of uplink beams.

23. The method of claim 21, wherein the indication of a target power reduction indicates a power value for each of said plurality of uplink beams.

24. The method of claim 13, wherein the target power reduction and the actual uplink duty cycle are controlled in dependence of each other, such a total transmit power of the terminal remains below a threshold value.

25. A radio terminal, comprising:
a radio transceiver,
logic configured to communicate data, via the radio transceiver, with a radio network node, wherein the logic is further configured to
determine a demand power reduction based on a maximum power level, associated with a first uplink duty cycle;
transmit, to a radio network node, an indication of the demand power reduction;
receive, from the network node, an indication of a target power reduction and an actual uplink duty cycle associated with the target power reduction; and
receive, from the network node, network scheduling for an uplink transmission of the radio terminal in accordance with the actual uplink duty cycle; and
configure the output power based on the target power reduction.

26. A radio network node, for configuring uplink output power of radio transmission from a radio terminal, comprising:
a radio transceiver,
logic configured to communicate data via the radio transceiver, wherein the logic is configured to
receive, from the radio terminal, an indication of a demand power reduction based on a maximum power level, associated with uplink transmission with a first uplink duty cycle;
determine a target power reduction for the radio terminal;
transmit, to the radio terminal, an indication of the target power reduction to apply by the radio terminal for configuring the output power;
determine, an actual uplink duty cycle associate with the target power reduction; and
schedule, an uplink transmission from the terminal in accordance with the actual uplink duty cycle.

* * * * *

UNITED STATES PATENT AND TRADEMARK OFFICE
CERTIFICATE OF CORRECTION

| | |
|---|---|
| PATENT NO. | : 12,004,086 B2 |
| APPLICATION NO. | : 17/434743 |
| DATED | : June 4, 2024 |
| INVENTOR(S) | : Kun Zhao, Olof Zander and Rickard Ljung |

It is certified that error appears in the above-identified patent and that said Letters Patent is hereby corrected as shown below:

In the Claims (Column 11, Line 36): Claim 1 beginning with "A method, carried out in a radio network node" should be corrected to "A method, carried out in a radio terminal".

(Column 11, Line 38): Claim 1 "a radio terminal" should be corrected to "the radio terminal".

Signed and Sealed this
First Day of October, 2024

Katherine Kelly Vidal
*Director of the United States Patent and Trademark Office*